(12) United States Patent
Kurus et al.

(10) Patent No.: US 11,287,056 B2
(45) Date of Patent: Mar. 29, 2022

(54) VALVE FITTING

(71) Applicant: LPW Technology Ltd, Widnes (GB)

(72) Inventors: Marek Kurus, Chester (GB); Callum Healey, Liverpool (GB)

(73) Assignee: LPW Technology Ltd, Widnes (GB)

( * ) Notice: Subject to any disclaimer, the term of this patent is extended or adjusted under 35 U.S.C. 154(b) by 0 days.

(21) Appl. No.: 16/849,242

(22) Filed: Apr. 15, 2020

(65) Prior Publication Data

US 2020/0362985 A1 Nov. 19, 2020

(30) Foreign Application Priority Data

Apr. 16, 2019 (GB) .................................. 1905393

(51) Int. Cl.
| | |
|---|---|
| *F16K 35/10* | (2006.01) |
| *B65D 83/06* | (2006.01) |
| *F16K 1/22* | (2006.01) |
| *B33Y 40/00* | (2020.01) |

(52) U.S. Cl.
CPC .............. *F16K 35/10* (2013.01); *B65D 83/06* (2013.01); *F16K 1/22* (2013.01); *B33Y 40/00* (2014.12)

(58) Field of Classification Search
CPC ................................ F16K 35/10; B65D 83/06
USPC ................................ 138/89–95; 251/285–287
See application file for complete search history.

(56) References Cited

U.S. PATENT DOCUMENTS

| | | | | |
|---|---|---|---|---|
| 110,953 | A | * | 1/1871 | Brundred ................ F16K 35/10 137/382 |
| 577,461 | A | * | 2/1897 | Sterner .................... E03B 9/02 137/294 |
| 1,325,334 | A | * | 12/1919 | Schroeder ................ F16K 3/08 137/316 |
| 3,450,148 | A | * | 6/1969 | Mongelluzzo .......... F16K 35/10 137/296 |
| 3,797,286 | A | * | 3/1974 | Saporito ................. F16K 35/10 70/169 |
| 5,259,589 | A | * | 11/1993 | Posner .................. F16K 5/0647 251/285 |
| 5,287,874 | A | * | 2/1994 | Dixon .................... F16K 35/10 137/1 |
| 5,607,084 | A | * | 3/1997 | George ................ B67D 1/1466 137/383 |
| 6,112,761 | A | | 9/2000 | Scotto |
| 7,871,312 | B2 | * | 1/2011 | Wirkkala ................ A62C 99/00 451/430 |
| 8,336,850 | B2 | * | 12/2012 | Bauer ................... F16K 5/0605 251/94 |
| 2010/0132807 | A1 | * | 6/2010 | Vasconi ................. F16K 27/006 137/296 |

(Continued)

FOREIGN PATENT DOCUMENTS

WO 2015/028801 3/2015

*Primary Examiner* — Kevin F Murphy
(74) *Attorney, Agent, or Firm* — Burns & Levinson LLP; Bruce D. Jobse; Daniel McGrath

(57) ABSTRACT

A fitting prevents the unintentional flow of flowable material out of a container through a valve. The valve comprises a housing, a flow control element rotatable between an open configuration and a closed configuration, and an actuator for moving the flow control element, wherein the fitting is adapted for insertion into the housing which in use locks the flow control element in a closed configuration by preventing rotation of the flow control element.

20 Claims, 3 Drawing Sheets

(56) References Cited

U.S. PATENT DOCUMENTS

2011/0036421 A1\* 2/2011 Minnella ................ B65D 90/22
137/382
2012/0060940 A1\* 3/2012 Francis .................. E21B 33/02
137/343
2017/0101232 A1\* 4/2017 Smeets .................. B41J 2/1754

\* cited by examiner

VALVE FITTING

CROSS-REFERENCE TO RELATED APPLICATION

This application is claims priority to and the benefit of Great Britain Application No. 1905393.3, filed Apr. 16, 2019 entitled VALVE FITTING, which is incorporated herein by reference in their entirety for all purposes.

TECHNICAL FIELD

The present disclosure relates to an assembly, a method and a kit of parts for preventing the unintentional flow of flowable material out of a container through a valve.

BACKGROUND

Butterfly valves are a well-known type of valve for controlling the flow of material out of a container. They typically comprise a valve housing which is connectable to the container, a rod pivotally mounted within the valve housing and a circular disc mounted to the rod. An actuator is typically located outside of the valve housing and is connected to one end of the rod. By rotating the actuator the disc is caused to turn to a position perpendicular to the flow of material (closed position) or to a position parallel to the flow of material (open position).

A known problem of butterfly valves is that improper positioning of the actuator or intentional or unintentional adjustment of the actuator may result in material in the container being inadvertently dispensed. Accordingly, any material that is inadvertently dispensed may become contaminated. In the context of additive manufacturing where the material is typically a valuable metal powder, this is undesirable and will often result in valuable powder having to be discarded. A valve cap can be used to close the opening of the butterfly valve through which powder is dispensed, but once fitted, an operative is unable to check whether the valve is open or closed meaning that valuable powder may be lost upon removing the cap from the housing.

In view of the above, it is an object of embodiments of the disclosure to provide an assembly and method for preventing material in a container from being unintentionally dispensed.

SUMMARY

According to a first aspect of the disclosure there is provided an assembly for preventing the unintentional flow of flowable material out of a container through a valve, the valve comprising a housing; a flow control element rotatable between an open configuration and a closed configuration, and an actuator for moving the flow control element, wherein the assembly comprises a fitting adapted for insertion into the housing which in use locks the flow control element in its closed configuration by preventing rotation of the flow control element and means for detachably securing the fitting to the housing.

In addition to preventing rotation of the flow control element to prevent the inadvertent discharge of powder through the valve, the fitting may also be adapted to plug an opening in the housing, i.e. the fitting blocks the opening.

The fitting may be configured so that it cannot be fully inserted into the housing when the flow control element is in its open configuration.

In some embodiments the fitting is adapted to collect flowable material that may inadvertently escape from the container.

The fitting may comprise a cylindrical tube and a plate arranged to close one end of the cylindrical tube. Once inserted into the housing, the free end of the cylindrical tube obstructs and prevents rotation of the flow control element. Moreover, by closing one end of the cylindrical tube with the plate the fitting is able to collect small quantities of flowable material that may inadvertently escape from the container.

The end of the cylindrical tube opposite the plate may be free from formations, e.g. protrusions or recesses. The absence of formations in the cylindrical tube simplifies its construction and reduces the cost of manufacturing the fitting. It also reduces the risk that flowable material in the container is contaminated with flowable material that was previously held in the container.

The plate may be substantially circular in plan. In some embodiments the plate may comprise a downwardly tapering side wall. The tapering side wall helps to secure the fitting to the valve housing, e.g. by clamping and also enables the plate to be picked more easily, especially when the plate is placed on a flat surface prior to use.

The diameter of the plate may be greater than the diameter of the cylindrical tube, and in use forms a flange for connecting to a corresponding flange on the valve housing. The plate may comprise a circular groove for receiving a seal member. In particular, the seal member may be an O-ring. The seal member may be formed from a deformable material such as rubber or silicone.

The housing may be formed from a first housing part and a second housing part. The first housing part may be adapted for connection to the outlet pipe of the container while the second housing part may be adapted for connection to an inlet pipe of an additive manufacturing machine and to the fitting. In particular, the first housing part may be provided with a first connection flange and the outlet pipe may be provided with a first corresponding connection flange. Similarly, the second housing part may be provided with a second connection flange and the inlet pipe of the additive manufacturing machine may be provided with a second corresponding connection flange. Each connection flange and each corresponding connection flange may comprise a circular recess adapted to receive a seal member. A gasket may be provided between the first housing part and the second housing part.

When a seal member is provided in the circular groove and the fitting is brought into engagement with the valve housing, a seal is formed between the plate of the fitting and the housing. In embodiments where the housing comprises a first housing part and a second housing part, the cylindrical tube is inserted into the second housing part and the plate is brought into sealing engagement with the second connection flange of the second housing part.

The fitting may be formed from a metal or metal alloy. Fittings made of metal or metal alloys are robust and inexpensive to manufacture. Preferably the fitting is smooth and substantially free from crevices and pits. In particular, the interior surface of the cylindrical tube and the top surface of the plate are preferably free from crevices and pits since these are known to act as corrosion sites and also increase the risk of contamination. In some embodiments, the fitting is formed from stainless steel which offers superior corrosion resistance. In other embodiments the fitting may be formed from a plastics material.

The valve may be a butterfly valve in which case the flow control element may comprise a substantially circular disc mounted on a rod. The rod may be connected to or extend into the actuator so that when the actuator is rotated, the disc is caused to rotate between a first configuration that prevents flowable material from flowing out of the container and a second configuration which permits the flow of flowable material out of the container. Alternatively, the valve may be any valve with an eccentric rotatable part, e.g. a flap valve.

The actuator may comprise an elongate handle although other shaped handles, or in certain instances, wheels can be used.

According to a second aspect of the disclosure there is provided an assembly for preventing the unintentional discharge of flowable material from a container, wherein the assembly comprises a valve comprising a housing, a flow control element rotatable between an open configuration and a closed configuration and an actuator for moving the flow control element, and a fitting adapted for insertion into the housing which in use locks the flow control element in its closed configuration by preventing rotation of the flow control element.

In some embodiments the flow control element may comprise a substantially circular disc mounted on a rod. The actuator which is configured to move the flow control element may comprise an elongate handle. The assembly may comprise means for detachably securing the fitting to the housing, e.g. a clamp. Alternatively, the fitting may be detachably secured to the housing through an interference fit.

The assembly may comprise a container. The container may have a part conical main body which leads into an outlet pipe. The container is preferably formed from a metal alloy such as stainless steel. Stainless steel offers superior corrosion resistance and is relatively inert meaning it tends not to interact with flowable material that is being stored in the container. In one embodiment the container may be a hopper.

The container may comprise a flowable material such as powder. In particular, the flowable material may be metal or metal alloy powder for use in additive manufacturing.

According to a third aspect of the disclosure there is provided a method of preventing the unintentional discharge of flowable material from a container through a valve, the valve comprising a housing; a flow control element rotatable between an open configuration and a closed configuration and an actuator for moving the flow control element, wherein the method comprises the steps of inserting a fitting into the housing to lock the flow control element in its closed configuration and detachably securing the fitting to the housing.

The method according to the second aspect of the disclosure may, as appropriate, incorporate any or all features discussed above in relation to the assembly according to the first aspect of the disclosure.

In some embodiments the fitting may be detachably secured to the housing using a clamp.

According to a fourth aspect of the disclosure, there is provided a kit of parts comprising a valve for a container for storing flowable material, the valve comprising a housing; a flow control element rotatable between an open configuration and a closed configuration and an actuator for moving the flow control element; a fitting adapted for insertion into the housing and means for detachably securing the fitting to the housing.

The kit according to the third aspect of the disclosure may, as appropriate, incorporate any or all features discussed above in relation to the assembly according to the first aspect of the disclosure.

The means for detachably securing the fitting to the housing may comprise a clamp.

BRIEF DESCRIPTION OF THE FIGURES

So that those having ordinary skill in the art to which the disclosed technology appertains will more readily understand how to make and use the same, reference may be had to the following drawings.

DETAILED DESCRIPTION OF THE EMBODIMENTS

Figure 1:
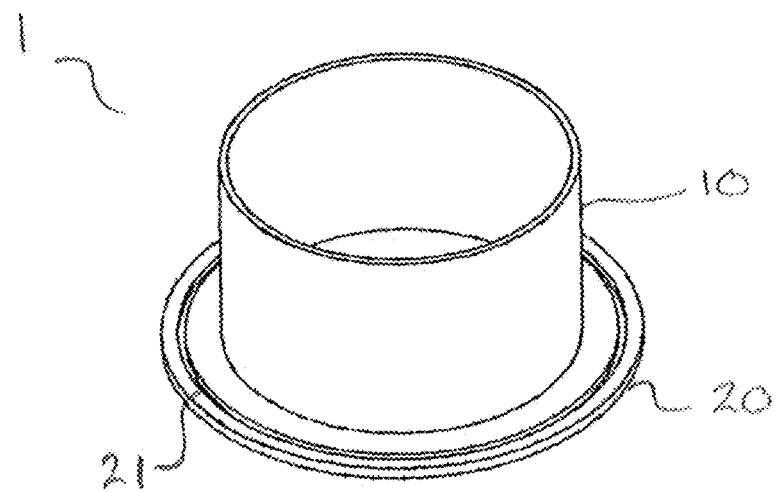
FIG. 1 shows a perspective view of the fitting.

In order that the disclosure may be more clearly understood one or more embodiments thereof will now be described, by way of example only, with reference to the accompanying drawings.

The fitting 1 of present disclosure is particularly suitable for preventing the unintentional discharge of powder 210 from a container 200 comprising a butterfly valve 100. The butterfly valve 100 has a first housing part 110 and a second housing part 120 which together define a through passage. A gasket 130 is provided between the first and second housing parts 110, 120. The first housing part 110 is adapted for connection to a connection flange 211 of a container 200 for storing metal powder 210 and the second housing part 120 is adapted for connection to adjacent pipework, e.g. an inlet pipe 300 of an additive manufacturing machine (not shown). Accordingly, the first and second housing parts 110, 120 comprise respective connection flanges 111, 121. Each connection flange 111, 121 comprises a circular recess 112, 122 adapted to receive a seal member (not shown). The inlet pipe 300 comprises an inlet pipe valve 310 for controlling the flow of powder 210 into the additive manufacturing machine and a corresponding connection flange 311 for connecting to the connection flange 121 of the second housing part 120.

The butterfly valve 100 further comprises a pivotally mounted rod (not shown) which extends across the through passage and into a handle 140 located outside of the valve housing. A substantially circular disc 150 is mounted to the rod. By rotating the handle 140 through 90° the circular disc 150 is caused to rotate between an open configuration which allows powder 210 to flow out of the container 200 and a closed configuration in which the flow of powder 210 out of the container 200 is prevented.

A fitting 1 in accordance with the present disclosure comprises a cylindrical tube 10 formed from stainless steel. In this embodiment the cylindrical tube 10 has a length of 51 mm and a diameter of 89 mm. The cylindrical tube 10 is adapted for insertion into the second housing part 120. As best shown in FIG. 1, the free end of the cylindrical tube 10 is free from formations such as protrusions and recesses. This has the benefit that the cost of manufacturing the fitting 1 can be kept relatively low. It also reduces the risk of contamination, e.g. between two different metal powders.

Figure 2:
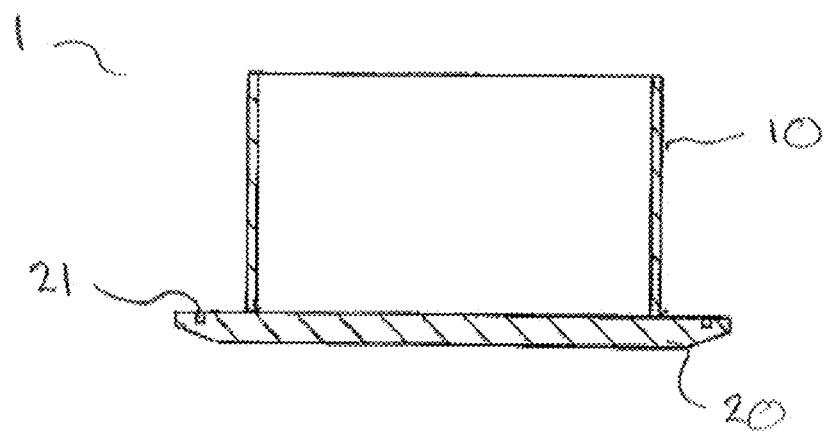
FIG. 2 shows a cross-sectional view of the fitting shown in FIG. 1.
Figure 3:
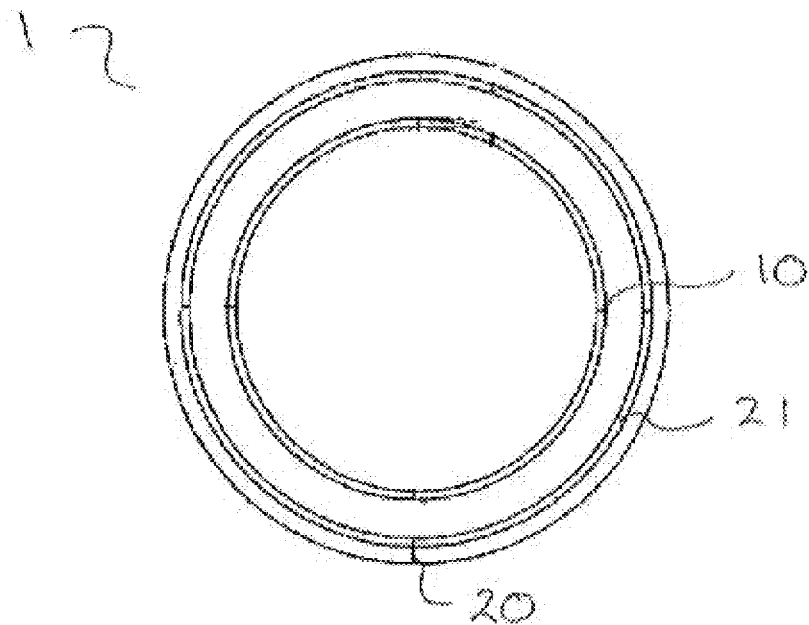
FIG. 3 shows a plan view of the fitting shown in FIG. 1.

The fitting 10 additionally comprises a substantially circular stainless steel plate 20 which closes one end of the cylindrical tube 10. As best shown in FIGS. 1 and 2 the diameter of the stainless steel plate 20 is greater than the diameter of the cylindrical tube 10 forming a flange of comparable diameter to that of the second housing part connection flange 121. A circular groove 21 is formed in the top surface of the flange and is adapted to receive a seal member such as a rubber O-ring.

In operation, the container 200 can be connected to the additive manufacturing machine by coupling the connection flange 111 of the first housing part 110 to the container connection flange 211 and by connecting the second housing part connection flange 121 to the inlet pipe connection flange 311. A vacuum flange clamp is used to clamp around the connection flange 121 of the second housing part 120 and the corresponding connection flange 311 of the inlet pipe 300.

Once the container 200 has been coupled to the additive manufacturing machine, an operative rotates the handle 140 ninety degrees to move the disc 150 from a closed configuration to an open configuration so that powder 210 in the container 200 is able to flow through the butterfly valve 100 and into the inlet pipe 300 of the additive manufacturing machine. Once a desired quantity of powder 210 has been dispensed from the container 200, the operative rotates the handle 90° so that the disc 150 moves from its open configuration to a closed configuration which prevents powder 210 from flowing into the inlet pipe 300. The vacuum clamp is then removed to enable decoupling of the second housing part 120 from the inlet pipe 300 of the additive manufacturing machine. With the disc 150 still in its closed configuration, the free end of the cylindrical tube 10 is inserted into the second housing part 120 until the plate 20 sealingly engages the second housing part connection flange 121. The second housing part 120 and the fitting 1 are then clamped together to detachably secure the fitting 1 to the second housing part 120.

Figure 4:
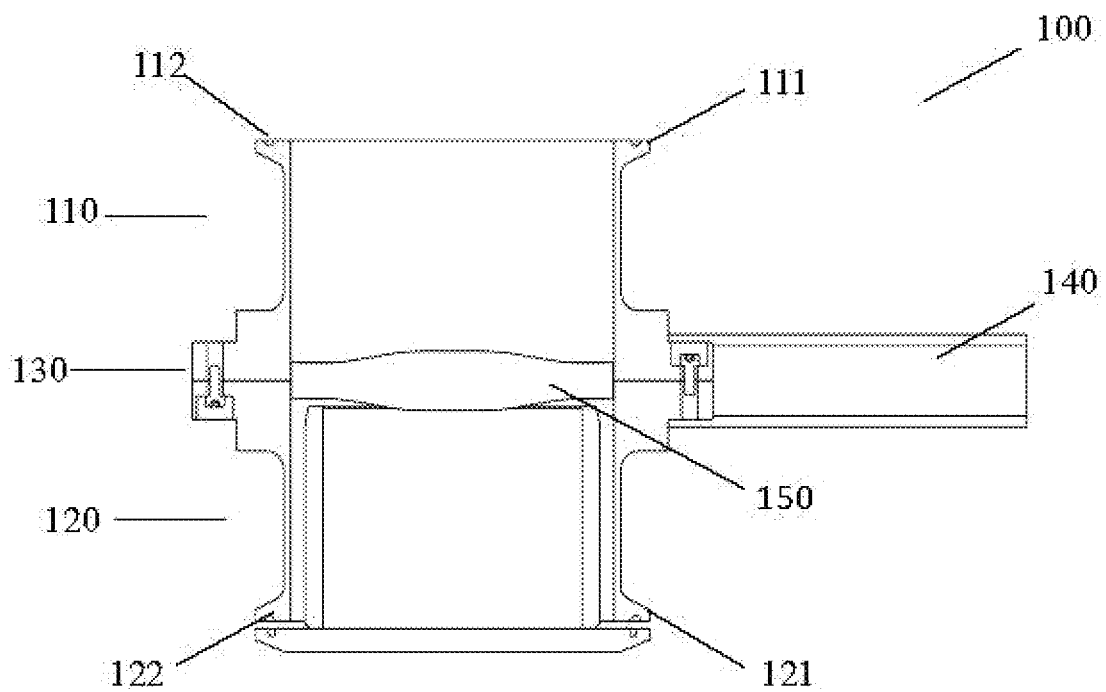
FIG. 4 shows a cross-sectional view of the fitting inserted into a butterfly valve.
Figure 5:
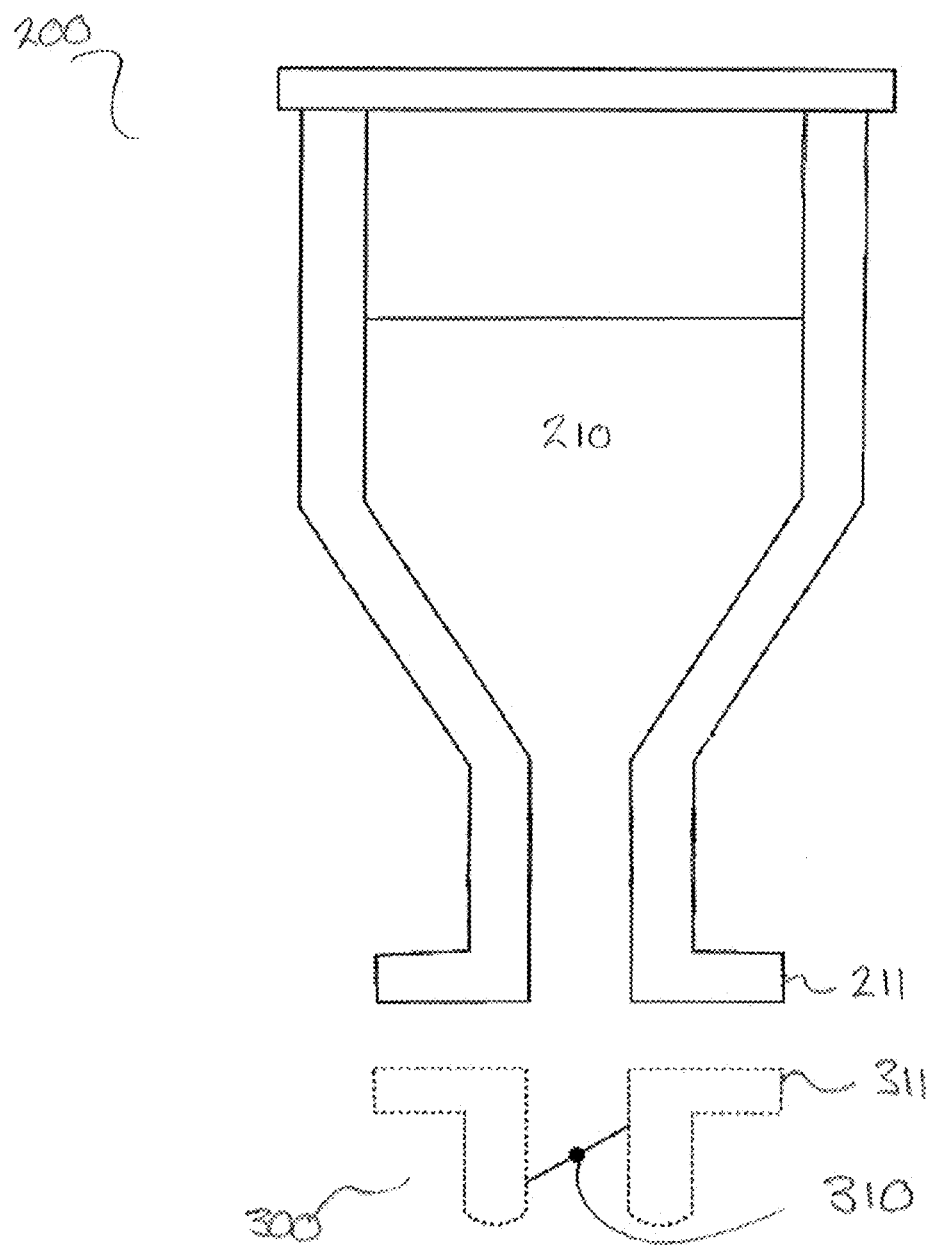
FIG. 5 shows a cross-sectional view of a container for storing powder.

As best shown in FIG. 4, insertion of the cylindrical tube 10 into the second housing part 120 obstructs the disc 150 to an extent that it is unable to move from its closed configuration to an open configuration, e.g. as a consequence of accidental or improper adjustment of the handle by the operative. Accordingly, insertion of the fitting 1 into the second housing part 120 prevents an operative from unintentionally dispensing powder 210 from the container 200 which would result in the powder 210 becoming contaminated and render it unusable in an additive manufacturing build operation.

The one or more embodiments described above are by way of example only. Many variations are possible without departing from the scope of protection afforded by the appended claims.

The invention claimed is:

1. A fitting for preventing the unintentional flow of flowable material out of a container through a valve, the valve comprising a housing having an opening through which, in use, the valve controls the flow of flowable material; a flow control element rotatable between an open configuration and a closed configuration, and an actuator for moving the flow control element, wherein the fitting is adapted for insertion into the opening of the housing which in use when inserted into the opening, plugs the opening and locks the flow control element in its closed configuration by preventing rotation of the flow control element.

2. A fitting according to claim 1, wherein the fitting is adapted to collect flowable material that inadvertently escapes from the container.

3. The fitting according to claim 1, wherein the fitting is configured so that it cannot be fully inserted into the housing when the flow control element is in its open configuration.

4. A fitting according to claim 1, wherein the fitting comprises a cylindrical tube and a plate arranged to close one end of the cylindrical tube.

5. A fitting according to claim 4, wherein the end of the cylindrical tube opposite the plate is free from formations.

6. A fitting according to claim 4, wherein the plate is circular in plan.

7. A fitting according to claim 4, wherein the plate comprises a downwardly tapering side wall.

8. A fitting according to claim 4, wherein the diameter of the plate is greater than the diameter of the cylindrical tube.

9. A fitting according to claim 4, wherein the circular plate comprises a circular groove for receiving a seal.

10. A fitting according to claim 9, wherein the housing comprises an annular shoulder provided with a recess that is adapted to the receive the seal.

11. An assembly for preventing the unintentional discharge of flowable material from a container, wherein the assembly comprises a valve comprising a housing having an opening through which, in use, the valve controls the flow of flowable material, a flow control element rotatable between an open configuration and a closed configuration, an actuator for moving the flow control element, and a fitting adapted for insertion into the opening of the housing which in use, when inserted into the opening plugs the opening and locks the flow control element in its closed configuration by preventing rotation of the flow control element.

12. An assembly according to claim 11, wherein the flow control element comprises a substantially circular disc mounted on a rod.

13. An assembly according to claim 11, wherein the assembly comprises a container and the valve is connected to the container.

14. An assembly according to claim 11, wherein the container comprises a metal or metal alloy powder.

15. A method of preventing the unintentional discharge of flowable material from a container through a valve, the valve comprising a housing having an opening through which, in use, the valve controls the flow of flowable material; a flow control element rotatable between an open configuration and a closed configuration and an actuator for moving the flow control element, wherein the method comprises the steps of inserting a fitting into the opening of the housing and detachably securing the fitting to the housing thereby to plug the opening and lock the flow control element in its closed configuration.

16. A method according to claim 15 comprising the step of clamping the fitting to the housing.

17. A kit of parts comprising a valve for a container for storing powder, the valve comprising a housing having an opening through which the valve controls the flow of flowable material; a flow control element rotatable between an open configuration and a closed configuration and an actuator for moving the flow control element; and a fitting adapted for insertion into the opening of the housing which, in use when inserted into the opening, plugs the opening and locks the flow control element in its closed configuration by preventing rotation of the flow control element.

18. A kit according to claim 17, wherein the kit comprises means for detachably securing the fitting to the housing.

19. An assembly for preventing the unintentional discharge of flowable material from a container, wherein the assembly comprises a valve comprising a housing having an opening through which the valve controls the flow of flowable material when in use, a flow control element rotatable between an open configuration and a closed configuration, an actuator for moving the flow control element, and a fitting adapted for insertion into the opening of the housing, to plug the opening, wherein the fitting and valve are configured so that the fitting cannot be fully inserted into the opening when the flow control element is in its open configuration.

20. A fitting for preventing the unintentional flow of flowable material out of a container through a valve, the valve comprising a housing; a flow control element rotatable between an open configuration and a closed configuration, and an actuator for moving the flow control element, wherein the fitting is adapted for insertion into the housing which in use locks the flow control element in its closed configuration by preventing rotation of the flow control element, said fitting comprising a cylindrical tube a plate arranged to close one end of the cylindrical tube, a circular groove formed in the plate for receiving a seal, the seal being provided in the circular groove.

\* \* \* \* \*